United States Patent

Bovet et al.

[11] Patent Number: 4,923,266
[45] Date of Patent: May 8, 1990

[54] OPTICAL FIBER DEVICE FOR GENERATING A TRAIN OF SYNCHRONOUS LIGHT PULSES EACH COMPRISING AT MOST ONE PHOTON AND AN APPARATUS FOR MEASURING SAME

[75] Inventors: Claude Bovet, Founex, Switzerland; Edward M. Rossa, Gex, France

[73] Assignee: Organisation Europeenne pour la Recherche Nucleaire, Geneva, Switzerland

[21] Appl. No.: 343,224

[22] Filed: Apr. 26, 1989

[30] Foreign Application Priority Data

Apr. 27, 1988 [FR] France .................. 88 05613

[51] Int. Cl.$^5$ .................... G02B 6/26; G02F 1/00
[52] U.S. Cl. .................... 350/96.15; 350/96.16; 455/608
[58] Field of Search ............... 350/96.15, 96.16, 96.20, 350/96.29, 96.30, 96.10; 250/227; 455/608, 610, 612

[56] References Cited

U.S. PATENT DOCUMENTS

| | | | |
|---|---|---|---|
| 4,136,929 | 1/1979 | Suzaki | 350/96.15 |
| 4,473,270 | 9/1984 | Shaw | 350/96.15 |
| 4,511,207 | 4/1985 | Newton et al. | 350/96.15 |
| 4,652,079 | 3/1987 | Shaw et al. | 350/96.15 |
| 4,695,121 | 9/1987 | Mahapatra et al. | 350/96.15 X |
| 4,720,160 | 1/1988 | Hicks, Jr. | 350/96.15 |
| 4,755,022 | 7/1988 | Ohashi et al. | 350/96.30 |
| 4,778,239 | 10/1988 | Shaw et al. | 350/96.16 |
| 4,794,598 | 12/1988 | Desurvire et al. | 350/96.15 X |
| 4,815,804 | 3/1989 | Desurvire et al. | 350/96.15 |

FOREIGN PATENT DOCUMENTS 62-100706 5/1987 Japan .................. 350/96.11 X

Primary Examiner—John D. Lee
Assistant Examiner—Brian M. Healy
Attorney, Agent, or Firm—Larson and Taylor

[57] ABSTRACT

A device is provided for generating, from a single light pulse of brief duration, a train of synchronous light pulses each comprising at most one photon on average, comprising several optical paths ($1_1, 1_2, \ldots 1_n$) each formed by at least one single mode optical fiber with zero dispersion in the form of a loop closed on itself by end to end connection of its ends by at least one connector (20); the number of loops is n if the number N of the photons in the initial pulse is greater than $10^{2n}$; these loops are joined together two by two, following each other, by first directional optical coupling means ($2_{12}, 2_{23}, \ldots 2_{(n-1)n}$) having a relatively small optical coupling coefficient equal to about $(1/N)^{1/(n+1)}$; second directional optical coupling means ($3_1, 3_n$) also having a relatively low optical coupling coefficient joining the first ($1_1$) and last ($1_n$) loops with external optical paths (respectively 4 or 7; 5 or 8) respectively for the input of only a small part of the initial light pulse and for the output of the train of equidistant pulses formed at most of a single photon on average; the periods of rotation of the photons in the loops are equal to integral numbers, prime with respect to each other, of elementary periods T; and the periods of rotation of the photons in the loops are sufficiently small so that the photons remaining in the loops at the end of a sampling procedure do not form a background noise troublesome for the following sampling procedure.

11 Claims, 5 Drawing Sheets

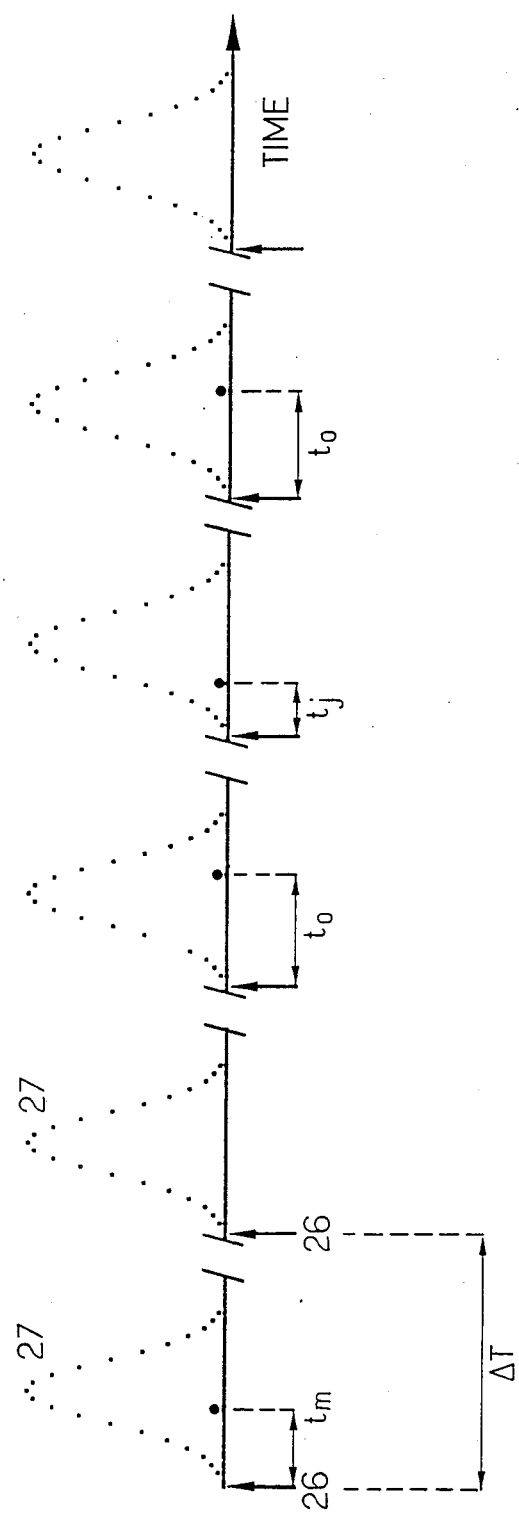

OPTICAL FIBER DEVICE FOR GENERATING A TRAIN OF SYNCHRONOUS LIGHT PULSES EACH COMPRISING AT MOST ONE PHOTON AND AN APPARATUS FOR MEASURING SAME

TECHNICAL FIELD OF THE INVENTION

The present invention relates to a device for storing photons and generating, from a single light pulse of brief duration, a train of synchronous light pulses each comprising one photon on average. The invention also relates to an apparatus for determining the form of a single light pulse of brief duration which applies said device, the profile in time of this single light pulse of brief duration being typically between 5 and 2000 picoseconds, this pulse possibly having very low energy (e.g. about 1 picojoule) and being an electromagnetic wave which may be either coherent or non coherent.

PRIOR ART

Knowledge of the profile in time of a light pulse may be obtained at the present time using different methods, depending on the type of pulse.

In the case of brief (1 to 100 ps) but repetitive light pulses, the photon pulses are first of all transformed into electric pulses by a photodetector and then analyzed.

This analysis is usually made by sampling the electric pulses using a sampling electron oscilloscope, which makes it possible to sample a part of the information at each electric pulse and thus construct the desired form by parts. Conventional electric sampling oscilloscopes exist which make it possible to attain rising fronts of 25 ps. Superconducting Josephson effect oscilloscope make it possible to attain 5 ps to 20 ps, as well as the optical Hamamatsu oscilloscope which uses a direct optical input on a slit scan tube.

This sampling technique only applies unfortunately to repetitive pulses.

In the case of coherent light, non linear optical devices are used for measuring self-correlation profiles in time of brief repetitive or non repetitive pulses in the range less than 1 ps. However, such self-correlators only operate with coherent light. Furthermore, the use of these sampling techniques requires, in order to obtain reliable results, the successive pulses to be perfectly periodic and of identical forms, a condition which is not often met with in practice. Finally, it is not possible, using this known technique, to determine the form of pulses in small numbers (e.g. less than 10), indeed even isolated pulses.

In the case, now, of a single light pulse (whether it is coherent or non coherent), several methods are at present used.

A slit scan camera is often used in which display of the pulse on a memory tube after sudden electric deflection makes a resolution of about 1 ps possible. However, the use of such a slit scan camera cannot always be contemplated because of its large geometrical dimensions and its high cost.

In addition, exploitation of the results is difficult: it requires a second camera for analyzing the image and requires considerable time for digital evaluation.

In some cases, transitory recorders may also be used, but the passband of such apparatus is at present only 6 GHz, which is insufficient for studying very brief light pulses.

The photoconductor self-correlator presented at San Diego by E. Rossa on 16-21 Aug. 1987 (SPIE) makes it possible to attain resolutions better than 10 ps for single pulses, but it requires enormous energies in the incident pulse (of the order of 1 microjoule absorbed by each photoconductor). Furthermore, it does not make possible measurement of the actual form of the pulse, but only of the self-correlation profile, and the number of measuring points is limited.

Another procedure, called statistical histogram method, consists in measuring the time at which events occur whose probability of occurrence is proportional to the amplitude of the pulse. The histogram of these events reproduces the form of the pulse on condition that the probability of occurrence of the event is sufficiently small (e.g. of the order of 1%) so that the possibility that the event is a multiple event remains negligible. This method is interesting for it is then sufficient to measure the time elapsing between a synchronous tripping and an event, which measurement may at the present time be achieved with an accuracy of the order of 10 ps. Of course, it is necessary to be sure, on the one hand, that all the events occurring are effectively detected and, on the other hand, that multiple events remain as rare as possible.

The use of the statistical histogram method involves recording events with low probability of occurrence and, since a large number of points (at least equal to 1000) is required for establishing a credible histogram, the number of passages of the photon pulses must be very high, namely several thousands.

This statistical method has up to now been used for measuring the form in time of light pulses by sampling a single photon only in the case of repetitive initial light pulses (see A. Corney in the review "Advanced Electronics and Electrophysics", vol 29 (1970), page 115).

Moreover, it has already been proposed to construct light pulse train generators formed by means of optical fibers closed on themselves so as to form closed loops in which the pulses circulate. An elementary closed loop construction is desired in the U.S. Pat. No. 4 136 929 (SUZAKI), the efficiency being however greatly affected by too rustic a construction.

In addition, the object sought with this known construction is not to obtain a train of synchronous light pulses each comprising a single photon on average, a result which this type of construction could moreover not provide effectively. Finally, the teaching of this patent remains purely theoretical, for no information is supplied for the practical realization which may lead to a usable result (in particular the fibers available at that time were not yet single mode and had high dispersion, the single fiber connectors did not perform well, etc.).

Using directional optical couplers, such as the one described in the article entitled "Single mode fiber optic directional coupler" by R. A. Bergh et al. in the review "Electronics Letters", vol 16, no. 7, 27th Mar. 1980, it is possible to construct, as indicated in the patent application EP 0 078 140, a better performing storage loop in which attenuation is about 2% per rotation. However, because the transmission coefficient of this type of coupling is 98%, the detector situated at the output sees a first pulse corresponding to 98% of the total energy of the photon packet whereas the following pulses fall to $10^{-4}$, the detector, dazzled by the first pulse, no longer detects the pulses which follow immediately and the error which results therefrom is unacceptable for providing any reliable detection, particular for using the above mentioned statistical histogram method.

With a closed loop having two directional optical couplers as described in the patent application EP 0 080 841 or in the article entitled "Single mode fiber recirculating delay line" by S. A. Newton et al. in the review SPIE vol 326 Fiber Optics—Technology '82 (1982), the energy of the pulses is uniformly brought to $10^{-4}$, including for the first pulse appearing at the output; however, the attenuation is then 4% per rotation and the number of pulses likely to be delivered to the detector for significant detection is too small (of the order of 25) for using the statistical histogram method. According to the article entitled "Optical fiber delay line signal processing" by K. P. Jackson et al., in the review "IEEE Transactions on Microwave theory and Techniques, vol HTT-33, no. 3, March 1985, also corresponding to the patent application EP-A-O 139 387 or also to the article entitled "High speed pulse train generation using single mode fiber recirculating delay lines", by Newton et al. in the review "Electronics Letters" vol 19, no. 19, September 1983, an arrangement is known having two closed loops disposed in series, which makes it possible to obtain, at the level of the detector, successive pulse trains slightly delayed with respect to each other and so to observe a large number of pulses. However, because of the series connection of the two loops each equipped with a single coupler, the first very high intensity pulse is transmitted at the output and this arrangement offers the same drawback as the above-mentioned single loop arrangement.

It may also be noted that the above-mentioned known devices having two closed loops disposed in series use optical couplers with a high coupling coefficient for providing the tangential connection of the optical fiber on itself, at the level of each loop. Obtaining output light pulses comprising a very small number of photons (indeed all the more so a single photon) would require this coupling coefficient to be the highest possible, at least 99%, even 99.9%. Technologically, that would involve the provision of large sized flat surfaces, by considerable polishing operations which are very difficult and delicate to carry out. Such coupling coefficients are extremely difficult to obtain in practice.

Furthermore, still from the manufacturing point of view, it should be noted that the prior art devices mentioned are formed by a single fiber, which is coiled on itself at several successive positions so as to form the series disposed loops. Such an embodiment requires polishing of the single fiber at a large number of positions (2 per loop), with each time considerable removal of material if a high coupling coefficient is desired. Such delicate and difficult work on the optical fiber presents great risks for a polishing error at any position results in the rejection of the fiber as a whole; if the error were committed on the last position to be worked, all the surfacing operations previously carried out were in vain. In any case, the cost of manufacturing such a single fiber device is very high.

In addition, the positions where the flat surfaces are to be formed are pre-determined by calculation. Once the polished surfaces are joined together so as to form a succession of loops, it is no longer possible to accurately adjust the individual length of the loops, and here again an error in the longitudinal positioning of any one of the polished surfaces, which cannot be compensated for, result in rejection of the whole fiber.

Finally, because of their very structure, known devices with a single fiber forming several loops only have a single input and a single output respectively at the two ends of the fiber, and therefore do not lend themselves to a dual use in which two currents are established flowing simultaneously in opposite directions.

In conclusion, none of the above-mentioned constructions was able to contribute effectively and efficiently to the implementation of the statistical histogram method in the case of a single initial light pulse.

OBJECTS OF THE INVENTION

The invention has then essentially as object to provide a device which makes possible the effective implementation of the statistical histogram method in the case of a single initial light pulse; in other words, which makes it possible to sample and store a large number of photons coming from a single pulse to be measured, although this pulse is single, the distribution in time of the photons stored being identical to that of the initial pulse and then to deliver these stored photons random fashion in accordance with a law of probability given by a periodic function of period $\Delta T$, with variable modulus reproducing the form of the initial pulse, the device being arranged so that a sampling procedure comprises several thousand measurement cycles; the device being further such that at each measurement cycle, the mathematical expectation of observing a photon is equal to or less than unity, thus guaranteeing the occurrence and observation of single photons whose occurrence times, in the period T, are characteristic of the form of the initial pulse stored by this statistical histogram; the device further detecting all the output pulses without being temporarily inhibited by a first pulse of too high an intensity; the device finally operating just as well with incoherent light as with coherent light.

PRINCIPAL ARRANGEMENTS OF THE INVENTION

According to the invention, the device for generating, from a single light pulse of brief duration, a train of synchronous light pulses each comprising at most one photon an average, is characterized:

in that it comprises several optical paths each formed by at least one single mode optical fiber with zero dispersion in the form of a loop closed on itself by end to end connection of its ends by at least one connector, in that the number of loops is n if the number N of the photons in the initial pulse is greater than $10^{2n}$, in that these loops are joined together two by two, following each other, by first directional optical coupling means having a relatively small optical coupling coefficient equal to about $(1/N)^{1/(n+1)}$, in that second directional optical coupling means also having a relatively low optical coupling coefficient join the first and last loops with external optical paths respectively for the input of only a small part of the initial light pulse and for the output of the train of equidistant pulses formed at most of a single photon on average, in that the periods of rotation of the photons in the loops are equal to integral numbers, prime with respect to each other, of elementary periods $\Delta T$, in that the periods of rotation of the photons in the loops are sufficiently small so that the photons remaining in the loops at the end of a sampling procedure do not form a background noise troublesome for the following sampling procedure.

Advantageously, the coupling coefficient of the first and second coupling means is less than 10%, in particular less than 1%.

Preferably, each loop is formed of two single mode optical fiber sections associated respectively in a fixed way with the second coupling means and two low loss optical connectors are provided for connecting these optical fiber sections end to end.

Preferably still, each loop is formed of three single mode optical fiber sections associated respectively in a fixed way with the second coupling means and three low loss optical connectors are provided for connecting these three optical fiber sections end to end.

Constructively, the device is formed of two successive loops: the periods $T_1$ and $T_2$ of rotation of the photons in these two loops are such that:

$$T_1 = p.\Delta T \text{ and } T_2 = q.\Delta T$$

$\Delta T$ being the duration of a measurement cycle and p and q being two prime integral numbers with respect to each other and satisfying the relationship:

$$Q_1^q + Q_2^p \leq 1$$

so that the second loop only outputs a single photon, $Q_1$ and $Q_2$ being the common ratios of the geometric progressions representing the decreases of the number of photons respectively in these two loops: the coupling coefficient of the first coupling means between the first loops is less by half than the coupling coefficients of the second coupling means of the first and second loops with the corresponding external optical paths, which coefficients are equal to about:

$$\sqrt[3]{1/N}$$

where N is the number of photons in the single input pulse.

The loops may be contained in thermostat controlled enclosures.

In an advantageous arrangement, the integral numbers which define the periods of the different loops are chosen so as to optimize the modulation in time of the periodic function created at the output of the device.

The relative values of the coupling coefficients of the different couplers are then chosen so as to maximize the number of efficient photons in the procedure of the statistical histogram method.

The apparatus for measuring the form in time of a single light pulse comprising an assembly such as above is, on the one hand, associated with a single photon detector and, on the other hand, connected to data processing means, these means reconstructing the histogram of the occurrence times, in each period $\Delta T$, of these single photons, this histogram representing the form in time of the single input light pulse.

In this apparatus, the two inputs are used with their respective outputs as two entirely independent assemblies.

In this apparatus, the histograms obtained at the outputs make possible a correlation in time between the light pulses injected in the inputs respectively.

With the arrangements which have just been discussed, a part only of the initial light pulse is introduced in the first loop and set in rotation therein with a constant period $T_1 = p.\Delta T$.

On passing through the first directional coupling means with low coupling coefficient (named first directional coupler hereafter), the moving photon packet loses a first fraction of its photons which is deflected into the second loop in which it rotates with a constant period $T_2 = q.\Delta T$.

On its second passage through the first directional coupler, the photon packet circulating in the first loop gives up a second fraction of photons which is deflected into the second loop. Because the numbers p and q are integral numbers, prime with respect to each other, the periods $T_1$ and $T_2$ are not multiples one of the other; the second photon fraction does not coincide with the first previously deflected photon fraction and does not increase it, but precedes (or follows) it by a time interval $\epsilon' = r.\Delta T$ where r is a positive integral number and $\Delta T$ is the duration of said measurement cycle.

The first and second photon fractions continue then to circulate in the second loop before, in the first loop, the photon packet returns to the first directional coupler and before a third photon fraction penetrates into the second loop with an advance (or delay) of ' on the second photon fraction.

And so on.

In other words, the apparatus of the invention behaves like a distributor, which, from an initial single pulse (or photon packet), present at the input and containing a high number of photons (e.g. $10^6$ photons) delivers at the output a multitude of pulses formed at most of one photon on average, all equidistant modulo T, on which a detector may make appropriate measurements.

Under these conditions, damping of the means value of the intensity of the photon radiation at the output remains relatively low and allows a very high number (e.g. of the order of 1000 of more) measurements to be made, which makes it possible to effectively implement the statistical histogram method for determining the form of the initial light pulse.

A device in accordance with the invention serves then as selector and, as will be seen further on, the detector placed at the output of the apparatus, sees pulses travel past which all (including the first one) have amplitudes of the same order of size, the detector then not being saturated by a first pulse having an amplitude greater by 3 or 4 orders of size than the amplitudes of the following pulses, as was the case in certain prior art devices.

Finally, the apparatus of the invention does not have particular difficulties in construction, since the loop paths may be formed from single mode optical fibers which are now well known in the technique, since the end to end connections of the single mode fibers are henceforth made possible by using connectors having negligible losses (less than 1%), since the length of each loop may be adjusted with very high accuracy by sectioning and iterative polishing of one end, during positioning of the connector closing the loop and since all the optical couplers have a low coupling coefficient and consequently present few losses.

In a preferred embodiment, each loop is formed of two single mode optical fiber sections associated respectively in a fixed way with the second coupling means and low loss optical connectors are provided for connecting these optical fiber sections end to end; this type of construction is made possible because of the existence of recent optical connectors which have very good efficiency. A fundamental advantage of this preferred embodiment resides in the fact that the optical couplers are formed individually on respective fiber sections and the defect of a coupler only involves rejecting this single section and not the whole of a large length of fiber which may be already partially machined as in prior art devices.

In a particularly simple embodiment, the device is formed of two successive loops, the rotational periods of the photons $T_1$ and $T_2$ in these two loops are such that:

$$T_1 = p \cdot \Delta T \text{ and } T_2 = q \cdot \Delta T.$$

$\Delta T$ being the duration of a measurement cycle and p and q being two integral numbers, prime with respect to each other, and satisfying the relationship:

$$Q_1^q + Q_2^p \leq 1$$

so that the second loop only produces at the output one photon on average, $Q_1$ and $Q_2$ being the common ratios of the geometrical progressions translating the decreases of the number of photons respectively in these two loops; the device is formed of two successive loops and the coupling coefficient of the first coupling means between the two loops is less by half than the coupling coefficients of the second coupling means of the first and second loops with the corresponding external optical paths, which coefficients are equal to about:

$$\sqrt[3]{1/N}$$

where N is the number of photons in the single input pulse.

Furthermore, synchronization of the movements of the photon packets in the loops must remain as perfect as possible, e.g. better than 10 ps ($10^{-11}$s) during the whole duration of the sampling procedure; such synchronization must itself be synchronous with a reference time base having, for example, a stability of 2 ps over the whole of a sampling procedure, i.e. about 20 ms, whence a precision of about $10^{-7}$, which may be obtained with a quartz clock. The rotational frequencies of the photon packets in the loops must then be adjusted with respect to the clock frequency with a precision of $10^{-7}$ which may be obtained in particular by a dimensional stabilization of the loops: for this, the optical fibers forming these loops may be enclosed in an enclosure controlled by thermostat with an accuracy of about 0.1° C.

In another aspect, the invention also provides an apparatus for detecting the form of a light pulse circulating in an initial fiber, comprising a device for generating equidistant light pulses having a single photon and means for detecting the occurrence time of these repetitive photons, which is characterized in that the equidistant light pulse generating device is formed as described above.

The device of the invention satisfies the above aims and makes it possible to obtain, from a single initial light pulse, light pulses each formed of at most one photon on average whose occurrence times in each period T are characteristic of the form of the initial pulse which may be restored by the histogram of these times, after possible correction taking into account multiple photons; when the form is close to a Gaussian curve, the typical deviation of the uncorrected histogram representing less than 0.2% the typical deviation of the initial pulse, the correction is not necessary.

Furthermore, the device operates as well with incoherent light as with coherent light.

In addition, the device makes it possible if required to process in parallel two light signals circulating in opposite directions to each other.

Moreover, these two parallel circuits may serve for forming a very high resolution time correlator.

Generally, the invention makes it possible to measure single, very brief and low energy light pulses (e.g. of the order of 1 pj). It is thus possible to measure very brief pulses circulating in an optical fiber by taking off a small fraction of their energy (e.g. 1%); the auscultated pulse continues its movement without being appreciably altered. It is also possible to reconstitute, using the device of the invention, the form of a single packet of electrons circulating in a particle accelerator, by reconstituting the form of the pulse of the synchrotronic radiation which corresponds to the form of the electron packet which generated it.

BRIEF DESCRIPTION OF THE DRAWINGS

The invention will be better understood from reading the detailed description which follows of a preferred embodiment, given solely by way of non limitative example, and in which reference is made to the accompanying drawings in which:

FIGS. 4A and 4B are two graphs illustrating the statistic sampling method.

DETAILED DESCRIPTION OF THE INVENTION

Figure 1:
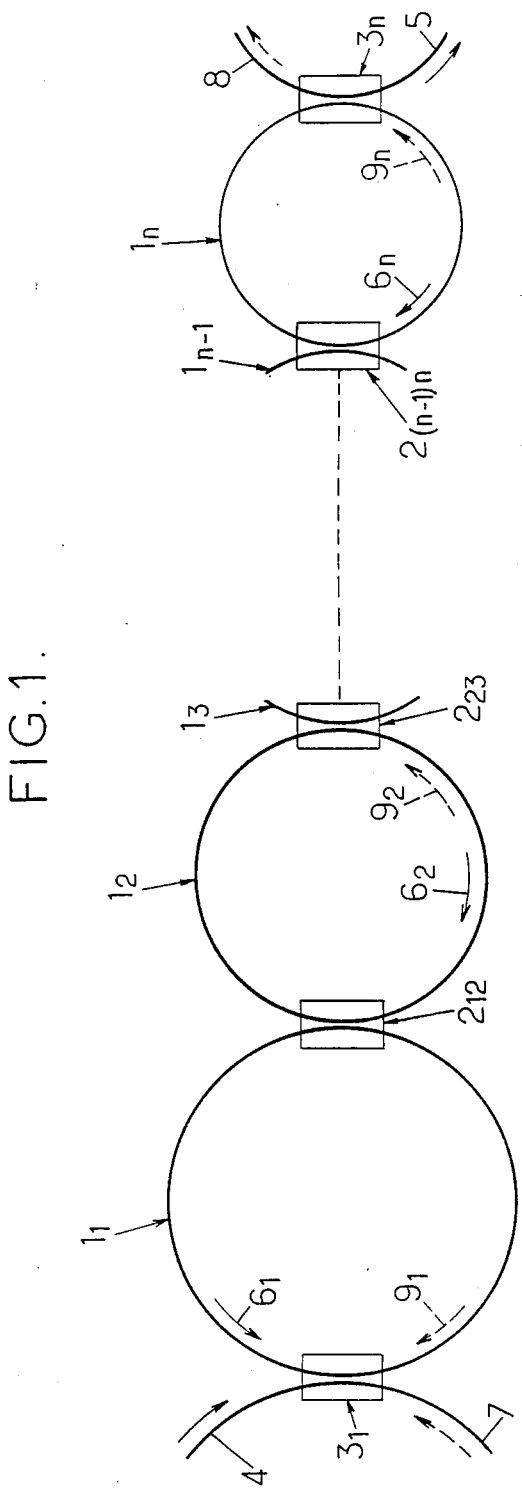
FIG. 1 is a very schematic representation of the general arrangement of a single photon equidistant light pulse generator adapted in accordance with the invention.

Referring first of all of FIG. 1, the device of the invention comprises several optical paths $1_1, 1_2, \ldots 1_n$ in the form of loops closed on themselves. The number of these loops being preferably equal to n if the number N of photons present in the initial light pulse—single and of brief duration and from which it is desired to obtain a train of equidistant light pulses each comprising a single photon—is greater than $10^{2n}$.

These loops $1_1, 1_2, \ldots 1_n$ are joined together two by two, following each other (i.e. by pairs $1_1$—$1_2$, $1_2$—$1_3$ . . . $1_{n-1}$—$1_n$, by first directional optical coupling means $2_{12}, 2_{23}, 2_{34}, \ldots 2_{(n-1)n}$ having a relatively low coupling coefficient equal to about $(1/N)^{1/(n+1)}$.

The first loop $1_1$ is further connected to an input circuit 4, 7 and the last loop $1_n$ is connected to an output circuit 5, 8, these connections being provided by second directional optical coupling means, respectively $3_1$ and $3_n$, also having a relatively low optical coupling coefficient.

All the optical paths are formed by zero dispersion single mode fibers because of their excellent optical performances.

Furthermore, each loop $1_1, \ldots, 1_n$ is independent of the fiber which precedes it and of the fiber which follows it with which it is only associated by the above optical couplers and is formed by end to end connection of its ends, by means of an appropriate optical connector.

The periods of rotation of the photons in the loops are chosen sufficiently small so that the photons remaining in the loops at the end of a sampling procedure do not form a background noise disturbing the next sampling procedure and, for the last two loops $1_{n-1}$ and $1_n$, the decreases of the number of photons respectively in the last but one loop $1_{n-1}$ and in the last loop $1_n$ are such that the last loop only produces on average a single photon.

The operating mode of the device of the invention will now be described in greater detail with reference more particularly, to make the explanation clear, to FIG. 2 which represents a simplified arrangement of the device of FIG. 1. The simplified device of FIG. 2 is formed solely of two loops (n=2) respectively $1_1$ and $1_2$ which are coupled to one another by a first directional optical coupler 2 having a coupling coefficient equal to about $$\sqrt[3]{1/N}.$$

Figure 2:
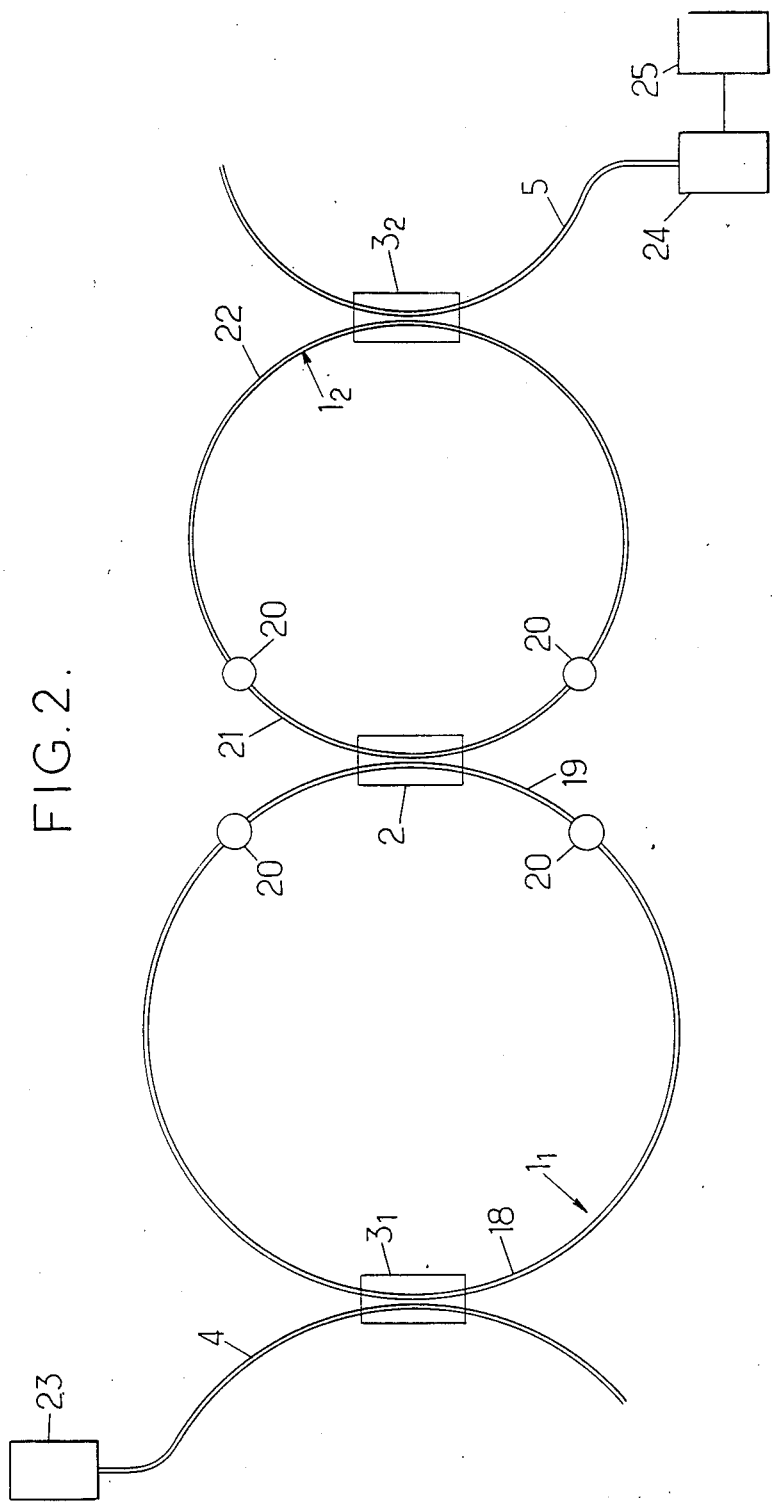
FIG. 2 is a very schematic representation of a particular arrangement of the device of the invention shown in FIG. 1, incorporated by way of example in an apparatus for detecting the form of a single light pulse circulating in an optical fiber.

In FIG. 2, the numerical references have been attributed to correspond to those of FIG. 1.

In this embodiment, each loop is formed not by a single optical fiber but by two single mode fiber sections joined end to end.

Thus, loop $1_1$ is formed by a section 18 fixedly secured to coupler $3_1$ and a section 19 fixedly secured to coupler 2. The two sections 18 and 19 are connected end to end by means of two low loss optical connectors 20. Through coupler $3_1$ passes an optical fiber 4 which is independent of fiber section 18 of loop $1_1$ while being optically coupled thereto and which forms the optical path for the initial pulse.

Similarly, through coupler $3_2$ passes an optical fiber 5 which is independent of the fiber section 22 of loop $1_2$ while being optically coupled therewith and which forms the optical path of the single photon output pulses.

Under these conditions, three couplers $3_1$, $3_2$ and 2 have a low coupling coefficient; for example the two couplers $3_1$ and $3_2$ are identical and have the same coupling coefficient which is twice the coupling coefficient of coupler 2.

When the loops are formed using removable couplers, one of the two connectors 20 of each loop may be omitted while taking care to form two semi-couplers on the same optical fiber, so as to reduce the losses thereof.

Fitting the connector which closes a loop on itself makes possible an accurate mechanical adjustment to $10^{-6}$ of the revolution time of the photons through recurrent sectioning of the fibers and final polishing of the connectors. This forms an essential characteristic of the invention which thus distinguishes it from the prior art.

In addition, the simplified device of the invention shown in FIG. 2 is shown included in a complete apparatus for measuring the occurrence time, in each period $\Delta T$, of the single photons obtained from an initial light pulse (obtaining the plot shown in FIG. 4B) so as then to be able to reconstitute the form in time of the initial pulse by using the statistical histogram method. For this, the output 5 of the device at which light pulses appear formed at most of one photon on average is connected to a detection device 24, itself connected to data processing means 25 for reconstituting, using the statistical histogram method, the form in time of the initial pulse as will be indicated further on.

Turning now more specifically to the operation of the apparatus of FIG. 2, at input 4 of the first optical path $1_1$ is applied an initial light pulse or initial photon packet emitted by a light source 23 (e.g. coherent light pulse emitted by a laser source, or else synchrotron radiation accompanying the movement of particles in a magnetic field). Considering the coupling characteristics of the directional coupler $3_1$, only a small portion (e.g. 1%) of this light pulse is directed into loop $1_1$. Because of the small differences of wavelength of the photons admitted into the initial pulse, adapted to the minimum dispersion of the single mode fiber, the speeds are extremely closely related and the packet may propagate over long distances (several kilometers) without being distorted. Damping of the intensity is about 4% per revolution (due particularly to the losses in couplers $3_1$ and 2 and in connectors 20).

At each passage of the photon packet through coupler 2, a fraction of the photons (e.g. 1% even 0.5%) is deflected in the direction of the second loop $1_2$ in which it rotates with a period $T_2$ which is in the ratio of the integral numbers q/p to period $T_1$.

Figure 3:
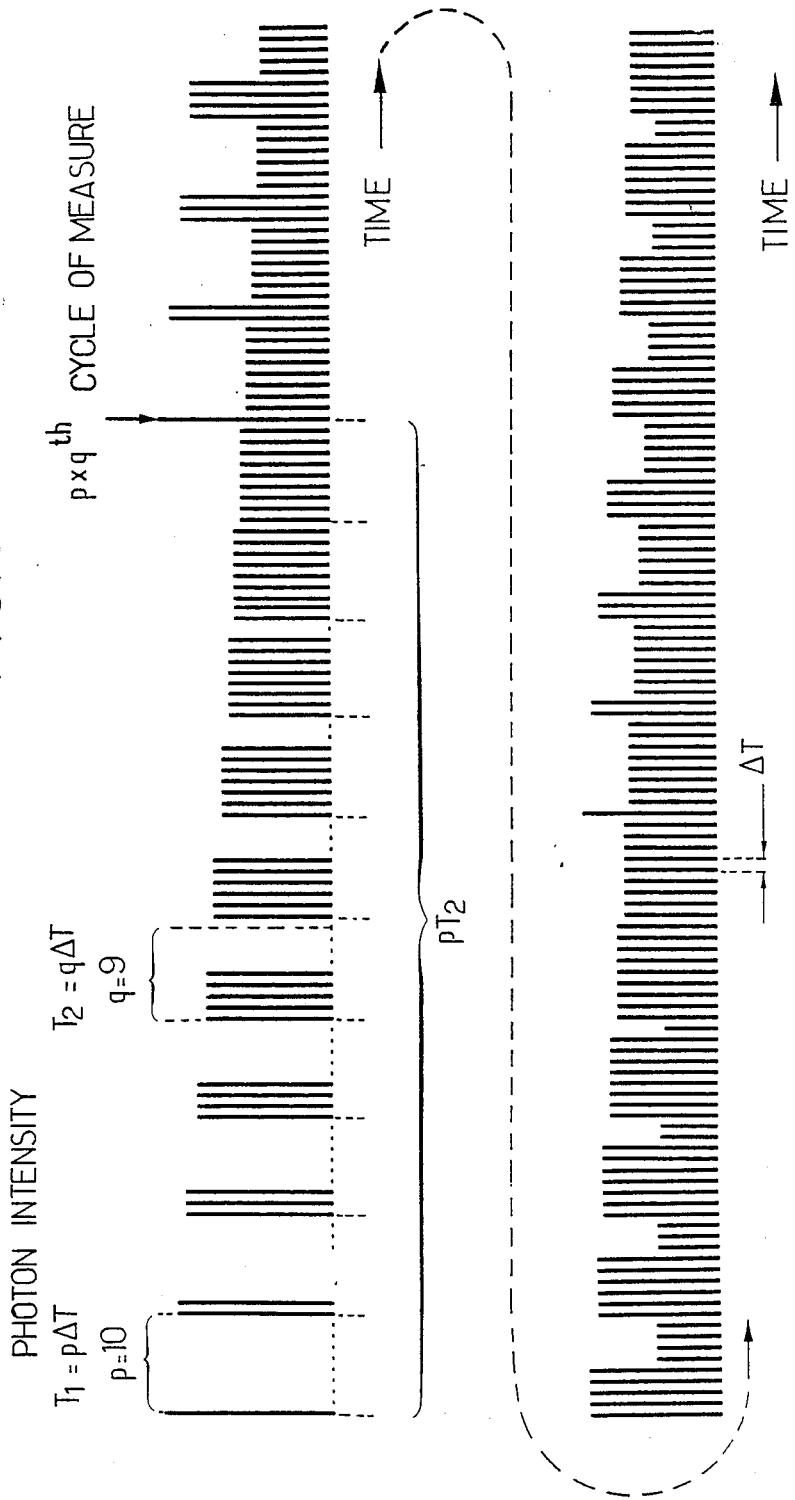
FIG. 3 is a graph showing the evolution in time of the intensity of the photons at the output of the apparatus of FIG. 2.

In a typical example where the ratio q/p is close to unity, the periods $T_1$ and $T_2$ are closely related, as is illustrated in FIG. 2 (more precisely, the introduction therebetween of a deviation $\Delta T$ leads to the typical values $T_1 = 180$ ns, $T_2 = 162$ ns), the second supply of photons arrives in the second loop a time $\Delta T$ after the first supply has effected a period $T_2$, and so on so that the second loop is filled with closely spaced packets (see again FIG. 3).

The intensity of the photon packets in a loop decreases at each revolution period because of the couplings chosen and because of the inevitable losses due to the couplers, to the connectors and to the fibers themselves, as a geometrical progression with common ratio Q equal to:

$$Q = 1 - \frac{\text{total losses in a period}}{\text{initial intensity}}$$

Since the common ratios $Q_1$ and $Q_2$ of the two loops considered in the typical example are equal, the packets decrease in the same way before and after being transferred from the first to the second loop, which explains that a group of dense packets is present at output 5 with constant intensity.

In order to prevent the precocious piling up of new supplies from the first loop on the packets already circulating in the second, the respective periods are chosen so that:

$$T_1 = p.\Delta T \text{ and } T_2 = q.\Delta T$$

p and q being two integral numbers, prime with respect to each other and T being the duration of the measurement cycle, the values $T_1$ and $T_2$ being sufficiently small so that the photons remaining in the loops at the end of a sampling procedure do not form a background noise disturbing the following sampling procedure.

After a time $T_1$ (delaying by T with respect to $T_2$ assuming p=q+1, as shown in FIG. 3), the photon packets circulating in the first loop $1_1$ has effected a complete revolution and yields up, in the directional coupler 2, a second photon fraction which penetrates into the second loop $1_2$ with an initial intensity $I_2$. This second photon fraction follows the first photon fraction at a time interval T so that their respective intensities are not cumulative and its intensity decreases in accordance with a geometric progression with common ratio $Q_2$ (see FIG. 3).

The same happens, in coupler 2, for each passage of the photons circulating in the first loop $1_1$.

It will be noted that, during its successive revolutions, the intensity of this photon packet also undergoes attenuation in accordance with a geometric progression with common ratio $Q_1$. In the typical example shown in FIG. 3, the common ratios $Q_1$ and $Q_2$ being assumed equal, the different packets of a dense group (from 2, 3 ... up to 10 packets) have the same intensity since they have passed through the same number of periods either in loop $1_1$ or in loop $1_2$.

When, finally, piling up occurs, at the end of a time equal to $p.q.\Delta T$, care must be taken that the resultant intensity does not exceed unity, namely:

$$Q_1{}^q + Q_2{}^p \leq 1$$

so that the second loop only produces an average one photon at its output $Q_1$ and $Q_2$ being the common ratios of the geometric progressions representing the decreases of the number of photons respectively in each of the loops.

It will then be understood that the light pulses reaching output 5 of the device have intensities which are all of the same order of size, whereby the operating range of the detector connected to output 5 may be better defined and the efficiency thereof improved. Through the piling up of the photon packets which occurs for the first time at time p.q. T, a partial compensation of the progressive attenuation of the pulses is obtained (see FIG. 3) and it is possible to supply, at output 5, a large number of single photon pulses (e.g. greater than 1000) making it possible, using data processing and display means, to implement the statistical histogram method for statistically reconstituting the form of the initial light pulse (or photon packet) travelling over path 4.

Furthermore, it will also be readily understood that this large number of single photon output pulses may be obtained, if required, from a single input pulse (in which the number of photons may for example be $10^6$).

In other words, in the apparatus of the invention, the first loops $1_1$ and $1_2$ behave like reservoirs of photons which they retain as long as desired with a decrease of intensity as low as possible and they periodically release photon packet fractions which, in their turn, free single photon pulses on which the occurrence times of the photons in period $\Delta T$ may be measured.

The photons circulate in the two loops in the directions shown by the continuous line arrows $6_1$, $6_2$ (see FIG. 1).

Since the device is reversible, it is possible to cause two sets of photon packets moving in opposite directions to each other to circulate in the device. For this (see FIG. 1), that one $3_1$ of the second coupling means which is associated with the first loop $1_1$ may also connect this loop to another external optical path 7 for inputting another initial pulse into loop $1_1$: similarly, that one $3_n$ of the second coupling means which is associated with the last loop $1_2$ may connect this loop to another external optical path 8 for outputting another train of equidistant single photon pulses. The photons circulate in the loops in the directions shown by the broken line arrows $9_1$, $9_2$ in opposite directions to the preceding ones.

Furthermore, it will be noted that the device of the invention operates just as well with a non coherent light pulse as with a coherent light pulse.

It will be readily understood that the reliability of the measurements rests on a perfect synchronization of the movements of the photons in the different loops, such synchronization having to guarantee a drift less, for example, than 10 ps up to the end of the sampling procedure. These movements must themselves be in synchronization with a reference time base having for example a stability of 2 ps over the whole of a sampling procedure (i.e. in the typical example envisaged, about 200 revolutions of the photon packet in the first loop $1_1$ so as to obtain about 1000 measurement points) of about 20 $\mu s$; whence a required accuracy of $10^{-7}$ which may be readily obtained using a quartz clock.

The rotational frequencies of the photons in the loops must then be adjusted with respect to the clock frequency with an accuracy of at least $10^{-7}$, which may be obtained:

(a) by recurrent sectioning of the optical fibers at the time of fitting the connector which closes the loop (accuracy of $10^{-4}$;

(b) by progressive polishing of the end pieces of the connector (accuracy of $10^{-6}$;

(c) finally, by dimensional stabilization of the optical fibers forming the loops, which is made possible by enclosing these fibers in thermostat controlled enclosures whose respective temperatures will be controlled to within 0.1° C.

To give a better idea, reference will be made to FIGS. 4A and 4B which illustrate the procedure for drawing up the statistical histogram.

In the graph of FIG. 4A, the occurrence times $t_m$, $t_o$, $t_j$, ... have been shown, as a function of time T, of the single photons detected by detector 24, measured with respect to reference pulses 26 (shown below the axis) which are perfectly periodic and synchronous, generated by a perfectly stabilized synchronous clock (not shown). In the same graph, the initial single light pulse 27 has been shown with dotted lines, positioned with respect to the clock pulses, which illustrates schematically the (random) position of the single photons detected in this pulse.

Figure 4B:
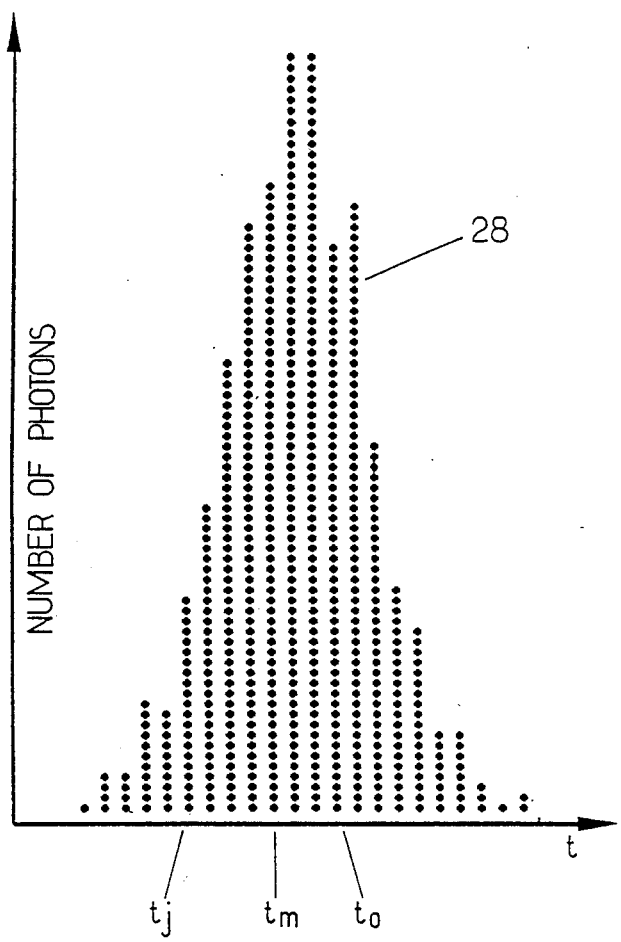

FIG. 4B is a graph on which the occurrence times $t_j$, $t_m$, ... have been plotted as abscissa and the number of single photons detected at occurrence times $t_j$, $t_m$, ... is plotted as ordinates. The envelope of the histogram 28 thus plotted forms an approximate representation of the form of the initial single light pulse, the approximation being of course all the better the higher the number of single photons detected.

As is evident and as is clear from the foregoing, the invention is in no wise limited to those of its modes of application and embodiments which have been more especially considered; it embraces, on the contrary, all variants thereof.

We claim:

1. Device for generating, from a single light pulse of brief duration, a train of synchronous light pulses each comprising at most one photon on average, characterized:

in that it comprises several optical paths ($1_1$, $1_2$, ... $1_n$) each formed by at least one single mode optical fiber with zero dispersion in the form of a loop closed on itself by end to end connection of its ends by at least one connector (20), in that the number of loops is n if the number N of the photons in the initial pulse is greater than $10^{2n}$, in that these loops are joined together two by two, following each other, by first directional optical coupling means ($2_{12}$, $2_{23}$, ... $2_{(n-1)n}$) having a relatively small optical coupling coefficient equal to about $(1/N)^{1/(n+1)}$, in that second directional optical coupling means ($3_1$, $3_n$) also having a relatively low optical coupling coefficient join the first ($1_1$) and last ($1_n$) loops with external optical paths (respectively 4 or 7; 5 or 8) respectively for the input of only a small part of the initial light pulse and for the output of the train of equidistant pulses formed at most of a single photon on average, in that the periods of rotation of the photons in the loops are equal to integral numbers, prime with respect to each other, of elementary periods $\Delta T$, in that the periods of rotation of the photons in the loops are sufficiently small so that the photons remaining in the loops at the end of a sampling procedure do not form a background noise troublesome for the following sampling procedure.

2. Device according to claim 1, characterized in that the coupling coefficient of the first and second coupling means is less than 10%, in particular less than 1%.

3. Device according to claim 1, characterized in that each loop ($1_1$ ... $1_n$) is formed of two single mode optical fiber sections associated respectively in a fixed way with the second coupling means and in that two low loss optical connectors (20) are provided for connecting these two optical fiber sections end to end.

4. Device according to claim 1, characterized in that each loop ($1_1$ ... 1) is formed of three single mode optical fiber sections associated respectively in a fixed way with the second coupling means and in that three low loss optical connectors (20) are provided for connecting these three optical fiber sections end to end.

5. Device according to claim 1, characterized in that it is formed of two successive loops ($1_1$, $1_2$); in that the periods $T_1$ and $T_2$ of rotation of the photons in these two loops are such that:

$$T_1 = p \cdot \Delta T \text{ and } T_2 = q \cdot \Delta T$$

$\Delta T$ being the duration of a measurement cycle and p and q being two integral numbers, prime with respect to each other, and satisfying the relationship:

$$Q_1{}^q + Q_2{}^p \leq 1$$

so that the second loop only outputs a single photon, $Q_1$ and $Q_2$ being the common ratios of the geometric progressions representing the decreases of the number of photons respectively in these two loops; and in that the coupling coefficient of the first coupling means between the two loops is less by half than the coupling coefficients of the second coupling means of the first and second loops with corresponding external optical paths, which coefficients are equal to about:

$$\sqrt[3]{1/N}$$

where N is the number of photons in the single input pulse.

6. Device according to claim 1, characterized in that the loops ($1_1$ ... $1_n$) are contained in thermostat controlled enclosures.

7. Device according to claim 1, characterized in that the integral numbers which define the periods of the different loops are chosen so as to optimize the modulation in time of the periodic function created at the output of the device.

8. Device according to claim 1, characterized in that the relative values of the coupling coefficients of the different couplers are chosen so as to maximize the number of efficient photons in the statistical histogram method.

9. Apparatus for measuring the form in time of a single light pulse comprising an assembly according to claim 1, characterized in that this assembly is, in the one hand, associated with a single photon detector (24) and, on the other hand, connected to data processing means (25), these means (25) making it possible to reconstruct the histogram of the occurrence times, in each period T, of these single photons, this histogram representing the form in time of the single input light pulse.

10. Apparatus according to claim 9, characterized in that the two inputs (4,7) are used with their respective outputs (5,8) as two entirely independent assemblies.

11. Apparatus according to claim 10, characterized in that histograms obtained at the outputs (5) make possible a correlation in time between the light pulses injected in the inputs (4,7) respectively.

* * * * *